United States Patent [19]

Masters

[11] Patent Number: 4,665,492
[45] Date of Patent: May 12, 1987

[54] COMPUTER AUTOMATED MANUFACTURING PROCESS AND SYSTEM

[76] Inventor: William E. Masters, 313 Dogwood La., Easley, S.C. 29640

[21] Appl. No.: 627,221

[22] Filed: Jul. 2, 1984

[51] Int. Cl.⁴ .............................................. G06F 15/46
[52] U.S. Cl. ..................................... 364/468; 264/24; 264/40.1; 364/191; 364/474; 425/145; 425/174.8 E
[58] Field of Search ....................... 364/468, 191–193, 364/474, 475; 264/40.1, 22, 24; 425/174, 174.8 R, 174.8 E, 145; 29/900

[56] References Cited

U.S. PATENT DOCUMENTS

| | | | |
|---|---|---|---|
| 1,382,978 | 6/1921 | Hopkins | 156/58 |
| 3,576,928 | 4/1971 | Barker et al. | 264/24 |
| 3,660,547 | 5/1972 | Ruekberg | 264/24 |
| 3,930,061 | 12/1975 | Scharfenberger | 264/24 X |
| 3,988,520 | 10/1976 | Riddle | 428/15 |
| 4,347,202 | 8/1982 | Henckel et al. | 264/24 |
| 4,400,705 | 8/1983 | Horike | 346/75 |
| 4,408,211 | 10/1983 | Yamada | 346/75 |
| 4,430,718 | 2/1984 | Hendren | 364/191 X |

OTHER PUBLICATIONS

"Ink Jet Printers-Automatic Coding on Almost Any Package"-*Modern Material Handling*, May 6, 1983-pp. 46-49.

Clark-"Designing Surfaces in 3-D"-Communications of the ACM-Aug. 1976-vol. 19, No. 8, pp. 454-460.
Staley et al.-"Computer-Aided Design of Curved Surfaces with Automatic Model Generation"-ASME Design Engineering Conf. & Show, Chicago, Ill.-Feb. 8, 1980-pp. 1-9.

*Primary Examiner*—Joseph Ruggiero
*Attorney, Agent, or Firm*—Cort Flint

[57] ABSTRACT

A computer automated manufacturing process and system (CAMPS) is disclosed which includes a computer system (12) which consists of a computer aided design computer (14) and a machine controller (16) which receives a file of coordinate information (18). An article (10) is designed by means of the computer aided design subsystem (14) and a data file of three-dimensional coordinate information is compiled. The coordinate information is input to the machine controller (16) which controls servos (20) and (22) in a polar coordinate system. The servos (20) and (22) further control the position of a working head (24) and working head (26) so that mass particles are injected to arrive at predetermined coordinate points in the coordinate system to form an article (34). An origination seed (32) is fixed at an origin of the coordinate system and the article (34) is built up around the origination seed (32). Other coordinate systems and apparatus for locating the mass particles at the coordinates of a three-dimensional article are disclosed so that the article may be built up in a number of coordinate systems, and controlled environments.

28 Claims, 8 Drawing Figures

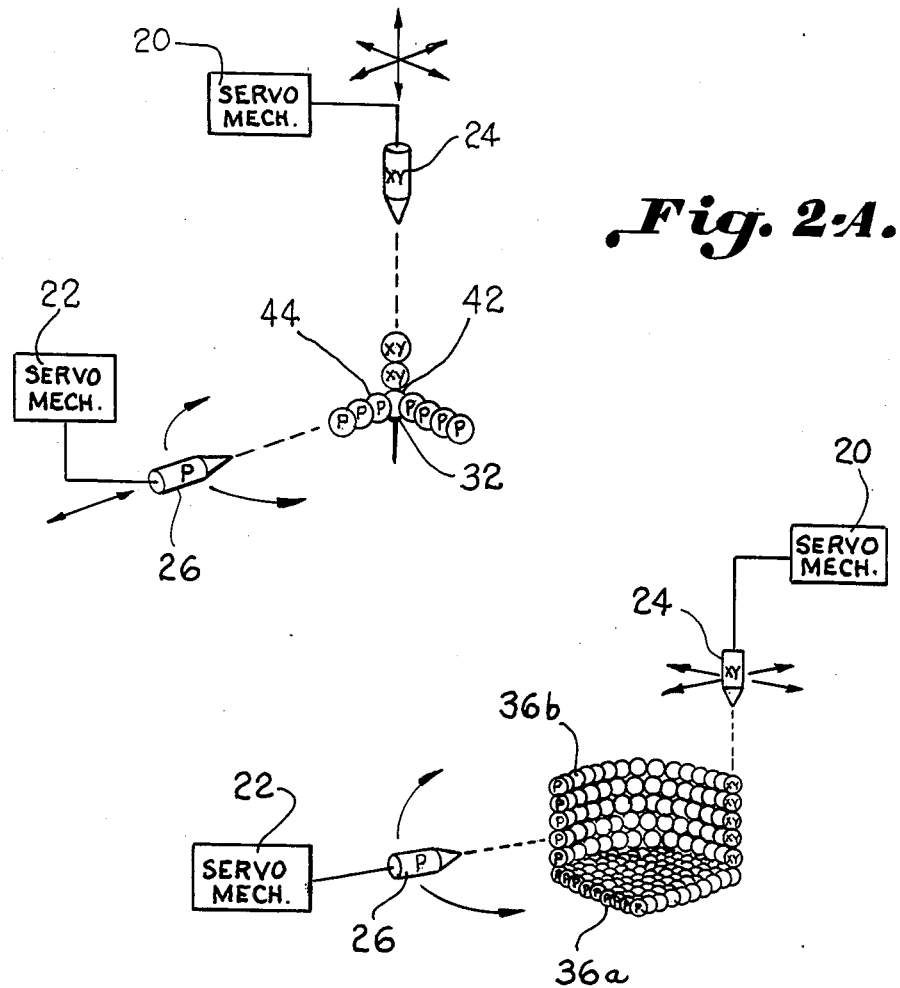
Fig. 2-A.
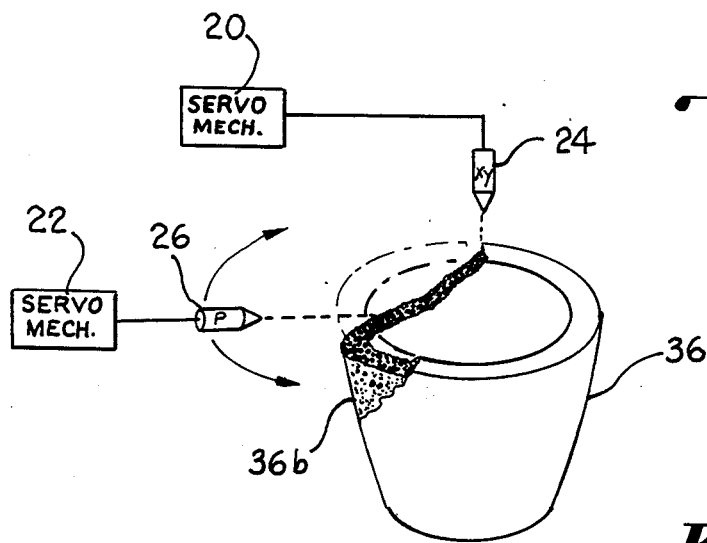
Fig. 2-B.
Fig. 2-C.

COMPUTER AUTOMATED MANUFACTURING PROCESS AND SYSTEM

BACKGROUND OF THE INVENTION

The invention relates to the automatic manufacturing of articles by use of computer aided design and control and more particularly to the automatic reconstruction of a three-dimensional design created by aid of a computer machine in the form of a physical three-dimensional object.

Heretofore, computer aided design (CAD) systems have been known. With the aid of a computer, an operator is able to design a two or three dimensional object and display the design on a screen or on paper. The computer aids in the overall design as called for by the operator according to pre-existing design parameters and computer software. One such computer aided design system is manufactured by Vector Automation of Baltimore, Maryland as CADMAX-II.

It has also been known to control a mechanical operation or manufacturing process by means of a computer such as in robotics. The robot or remote gripper jaw is manipulated by means of a preprogrammed computer to carry out a specific operation or task. For example, the milling of metal parts to produce a simple article by use of a computer aided milling machine has been widely applied. One such computer aided milling machine is that manufactured by the Cincinnati Milicron Company.

Other examples of computer aided mechanical operations include the spray painting of objects by means of a computer controlled spray gun arm which moves a spray gun in a predetermined pattern in order to repeatedly and uniformly paint objects in an assembly line. For example, the Thermwood Corporation of Richardson, Texas manufactures a computerized industrial robot for painting called the Paintmaster.

The three-dimensional reproduction of designs from photographs and grid charts has been heretofore known in the fields of photo-sculpture as disclosed in U.S. Pat. Nos. 3,988,520 and 1,382,978.

However, while the above can automatically carve or mill out a three-dimensional object from a larger stock of material, none of the above systems or processes have the capability of producing a three-dimensional object automatically in response to the computer aided design of the object wherein the object is built up and constructed from mass material to reproduce the design.

Accordingly, an important object of the present invention is to automatically reproduce a physical three-dimensional object which has been designed by the aid of a computer from the data file of the computer.

Still another important object of the present invention is to provide a process and system wherein a three-dimensional object can be constructed by building up particulate matter from a unique origination seed in response to a computer data file of the design.

Still another important object of the present invention is to provide an automatic process and system for manufacturing a three-dimensional object from particulate matter wherein particle directing beams direct and fix the location of particulate matter in accordance with a predetermined coordinate system and data file of coordinate information corresponding to the design created and generated on a computer machine.

SUMMARY OF THE INVENTION

The above objectives are accomplished according to the present invention by means of a method and system wherein an article is designed on a computer machine which generates a data file of coordinate information representing these three-dimensional coordinates of the computer aided design. The data file coordinates are transferred and input to a programmed controller which controls a servo-mechanism. The servo-mechanism, in turn, controls a movable ejection head which emits an energy beam that by force of propulsion or attraction, directs particles to the coordinates of the three-dimensional object in a three-dimensional coordinate system. A physical origination seed to which the particulate matter is attracted and the object is constructed from is located in a controlled environment at the origin of the coordinate system. The beam may be an ejection of the particles or a droplet containing the particular matter or may be an energy beam which attracts the particulate matter already in the environment to the seed or another coordinate. By moving the working head or heads under control of the computer according to the coordinate information representing the design, a physical three-dimensional article or object may be automatically constructed and manufactured in accordance with the design as built up from the seed point.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGS. 2A-2C illustrate various stages of the reproduction of a three-dimensional object in a polar coordinate system in accordance with the method and apparatus of the present invention;

DESCRIPTION OF A PREFERRED EMBODIMENT

Figure 1:
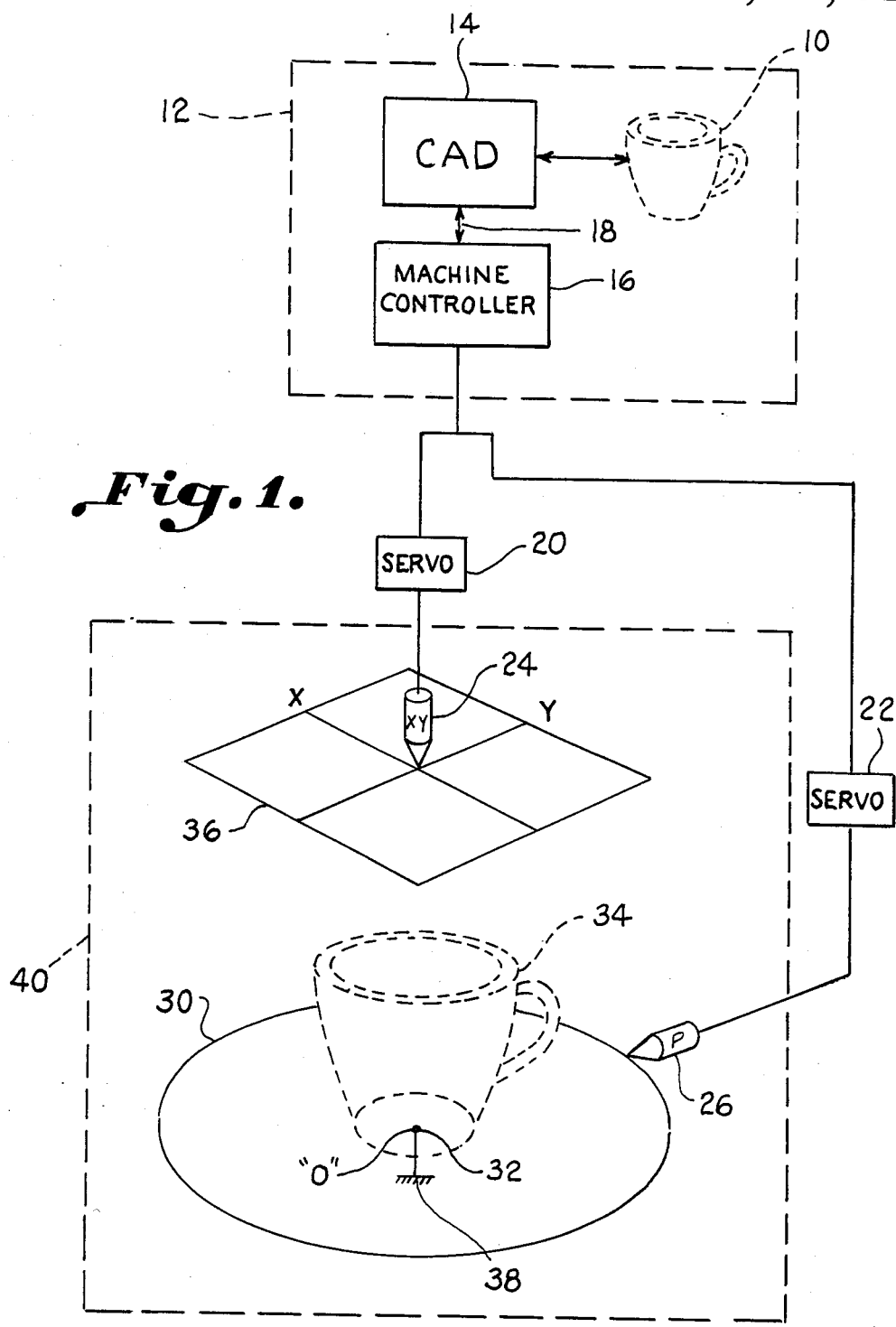
FIG. 1 is a schematic illustration illustrating the computer aided design of a three-dimensional article and the automatic reproduction of the article in three-dimensional physical form.

The invention relates to a computer automated manufacturing process and system which includes a method and apparatus for automatically reproducing a physical three-dimensional article which has been designed by aid of a computer machine as illustrated.

Referring now in more detail to the drawings, an article 10 in the form of a cup is illustrated which has been designed by a computer system 12 which includes a computer machine 14 which designs the article 10 by instructions from a draftsman or designer. Computer machine 14 may be a machine such as utilized in computer aided design.

In a typical computer aided design (CAD) system, a designer uses a natural dialog to talk to the computer machine by way of a data tablet and keyboard. He instructs the machine to create, scale, rotate, modify, and/or label the various elements of his design or drawing. The computer machine answers by interpreting the instructions, accomplishing what it was directed to do, displaying the results on the terminal CRT screen and compiling a data file corresponding to the design produced and displayed. When the drafting and design effort is complete, the data file containing coordinate information corresponding to the design produced may be stored on a hard disk or other computer storage media for permanent storage.

In accordance with the present invention, the data file which typically is in the form of coded binary information is transferred to a machine controller 16 which is part of the computer system 12. Any suitable computer software may be utilized to transfer this code of binary information into machine control language for input into the machine controller 16. The machine controller 16 sends signals to control a pair of servo-mechanisms 20 and 22 in much the same way that present technology uses to control robots and other machine devices. The control of the machine utilizing computers is commonly referred to as computer aided manufacturing (CAM) and a number of machines are available which may be incorporated in principle as machine controller 16.

The computer machine 14 which designs the article and the computer machine 16 which controls the servo-mechanism in response to the data file of three-dimensional coordinates generated by the machine 14, may be any suitable conventionally available CAD and CAM machines. On the other hand, the computer system 12 may include an integrated computer machine which incorporates the functions of both the computer design machine and the computer machine controller as is well within the purview of one having average skill in the art.

The servo-mechanism 20 controls by way of suitable mechanical linkages a working head 24 which may be any suitable ejection head having an ejection nozzle for emitting small mass particles or droplets of particulate matter. A second ejection head 26 is controlled by the servo-mechanism 22. Any suitable conventional servomotor and motion transmission mechanism may be employed for moving the working heads 24 and 26. For example, electrical servo motors may be employed in the servo-mechanisms which are controlled by electrical signals from the machine controller 16. In turn, the electrical motors control the position of the working ejection heads 24 and 26.

As illustrated, the spatial system for reproducing the article in three-dimensions is illustrated generally in the form of a polar coordinate system having a polar plane 30 in which the ejection gun 26 moves in a circular path around the origin zero of the coordinate system, a physical seed point 32 is located at the origin of the coordinate system. The origination seed 32 is the point about which the physical construction of the article 10 begins as will be more fully explained hereinafter. The gun 26 can move radially as well as vertically up and down in the plane.

Spaced above the polar plane 30 is an X-Y coordinate plane 36, parallel to the polar plane, in which the first ejection head 24 moves according to X and Y coordinates. The ejection gun 24 is moved by the servo-mechanism 20 in accordance with the three-dimensional coordinates of a data file 18 generated in response to the computer design of article 10 and transferred to the machine controller. It being understood, of course, that the article 10 is designed in the same coordinate system as the article 34 is reconstructed in, as is well within the purview of one having average skill in the computer arts having been taught the present invention.

The origination seed point 32 is fixed by means of any suitable structure at 38 within a controlled environment denoted by 40. The nature of the controlled environment will be dictated by the type of particulate matter which is utilized to construct the physical article 34. For example, the mass particles may be ceramic material and the controlled environment will contain an atmosphere which is heated to a desired temperature. The mass particles will be directed to the coordinates of the three-dimensional article as designed and stored in the data file 18. The ceramic particles will impinge and adhere first of all to the seed 32 and then when impinged against one another at the coordinates of the article 34. Subsequent particles will adhere to one another and build up the article in accordance with the three-dimensional coordinates contained in the data file and the program contained in the machine controller. A program for reproducing the articles may be any suitable software developed in accordance with current knowhow and well within the purview of one skilled in the art.

Referring now in more detail to FIGS. 2A–2C, the construction of the three-dimensional article 34 which has been designed by aid of a computer machine in three-dimensions may be illustrated at different stages of the construction. As illustrated in FIG. 2A, a first particle 42 will be directed to the seed point 32 and will impinge and adhere to the particle 32. The first particle may come from the X-Y ejection gun 24 so that it impinges directly on top of the seed point 32. The second and subsequent articles may be emitted in any number of combinations from the ejection heads 24 and 26 in accordance with the control provided by the machine controller 16 to make a base 36a for the cup wall 36b. For example, a second particle 44 may be ejected from the working head directly onto the particle 42 and joining therewith by any means of physical adhesion or bonding. FIG. 2B shows the article 34 after the base 36a has been partially formed and the side wall 36b is starting to be constructed. FIG. 2C shows a final stage of the article 36 being constructed with cup wall 36b almost finalized.

It is to be understood that other material systems may also be utilized out of which a physical article may be constructed. For example, plastic material may be utilized in an ionized atmosphere, for example, as in the existing technology of electrostatic painting. Additional adhesives may be utilized to adhere the particles together or they may fuse together by means of their chemical properties. A slurry material may be utilized having water content and the controlled atmosphere may include a closed environment which is cooled to a sub-zero temperature so that the particles will freeze upon impact with one another and the origination seed.

The ejection heads may eject an energy beam in the form of the particles to the coordinates for impingement and adhesion with one another or the beams may attract the particles to the coordinates for impingement and adherence to one another. For example, two or more working heads may be utilized which emit directional energy beams which intersect each other at intersection points. The beams will be controlled in accordance with the servo-mechanisms and machine controller so that the intersection points lie at the coordinate points of the three-dimensional object being constructed. The energy beams may be electromagnetic beams and the closed environment may contain magnetized particles which are attracted at the points of intersection of the electromagnetic beams. In another system, the working heads may be laser guns which emit laser beams that intersect one another and at the points of intersection create sufficient heat to fuse particles in the closed atmosphere of a controlled environment such that the particles fuse together at the coordinates.

The origination seed 32 may be any suitable material, for example, a metal, such as steel, or ceramic material in the case of a ceramic system. In the case of the slurry and laser systems, a metal material will probably be most advantageous. In the case of the ion system of electrostatic attraction, a metal or plastic material is preferred for example, and in a magnetic system, a metal material may be used.

In all of the above chemical and mechanical systems, the control of the working heads to direct the particles to the coordinates for impingement and adherence with one another would be well within the purview of one skilled in the computer and control art.

Figure 3:
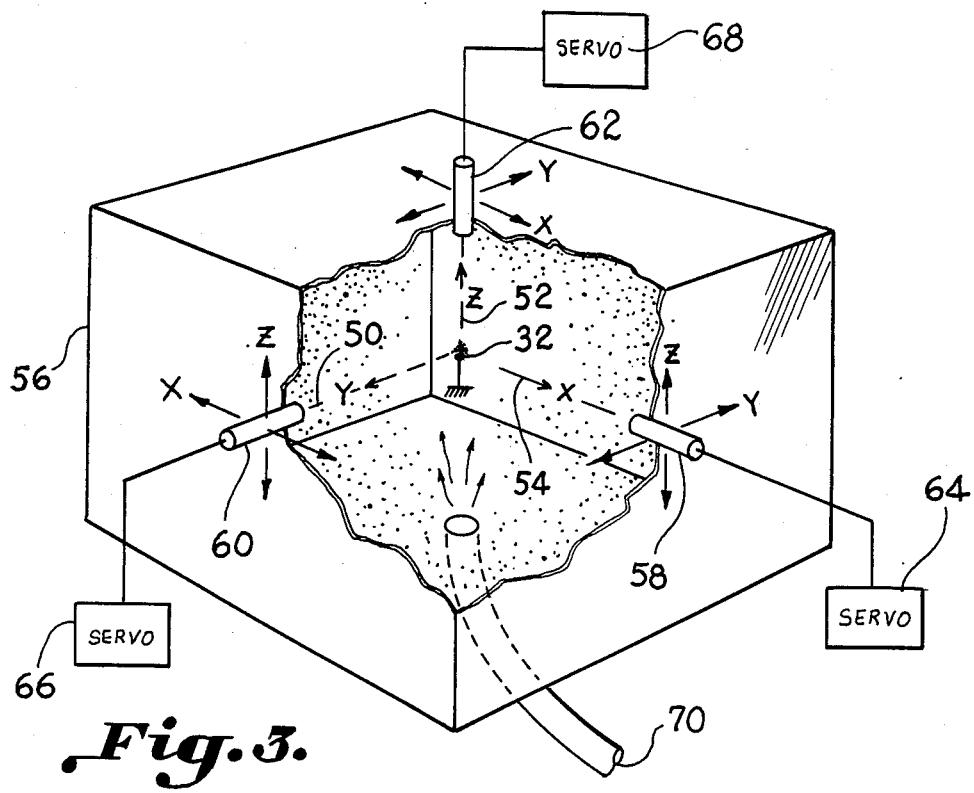
FIG. 3 is a perspective view illustrating a method and apparatus of an alternate embodiment of the present invention.
Figure 4:
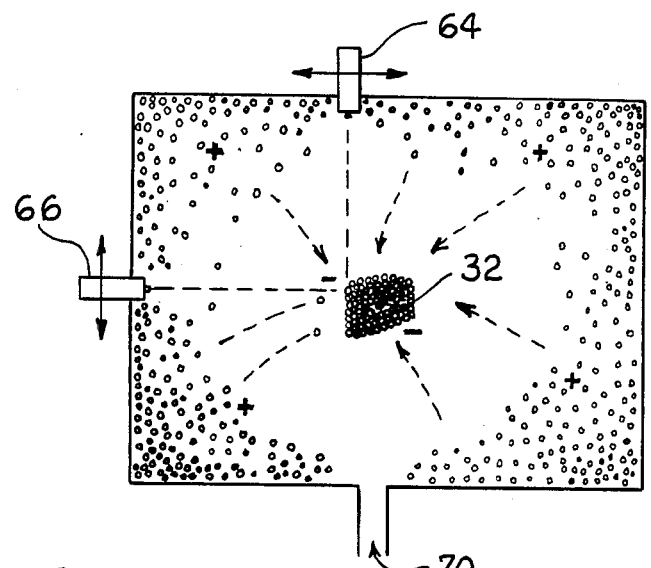
FIG. 4 is a top plan view of the apparatus and method of FIG. 3 for automatically reproducing a three-dimensional article which has been designed by aid of a computer machine in accordance with the present invention.

FIGS. 3 and 4 illustrate a system having a plurality of directional means for emitting a plurality of directional beams 50, 52, and 54. There is a chamber 56 which provides a controlled environment in which the origination seed 32 is fixed. The directional means are provided by three working heads 58, 60, and 62 which are controlled by servo-mechanisms 64, 66, 68, respectively. The servomotors of the servo-mechanisms are controlled by programmed controller 16. The working heads may be moved in their respective planes to produce intersecting beams having intersecting points at the desired coordinates which are illustrated at desired coordinates. The coordinate system illustrated in FIGS. 3 and 4 is that of a standard cartesian coordinate system having X, Y, Z axis. In this case, the design 10 is created in the cartesian coordinate system by the computer machine 14 and the data file contain a file of three-dimensional coordinates in the cartesian coordinate system. The seed point 32 is at the origin of the coordinate system.

Figure 5:
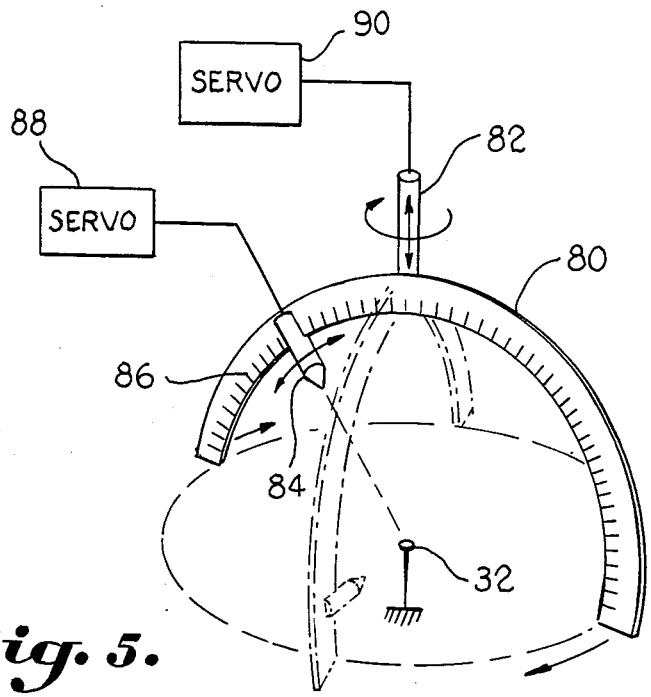
FIG. 5 is a perspective view illustrating another coordinate system and method and apparatus for automatically reproducing a three-dimensional object which has been designed by aid of a computer machine.

FIG. 5 illustrates an alternate embodiment for an apparatus according to the invention for directing particulate matter in accordance with predetermined three-dimensional coordinates for constructing a three-dimensional article. In FIG. 5, an arcuate support 80 is provided which covers a 180 degree arc. The arcuate support 80 is rotatable about an axis 82 in 360 degrees of movement about origination seed 32. A working head 84 is slidably carried on an arcuate track 86 of the arcuate support 80. The working head 84 may be moved by any suitable conventional servo-control mechanism 88 which, in turn, is controlled by the machine controller 16. In this case, only a single working head is needed for building up and constructing a three-dimensional article from the seed point 32. The rotation of the support 80 is also controlled by a suitable servo 90 which may also be controlled by the machine controller 16. The working head 84 emits an energy beam which propels the particles towards the coordinates where they impinge and adhere to one another as explained heretofore.

Figure 6:
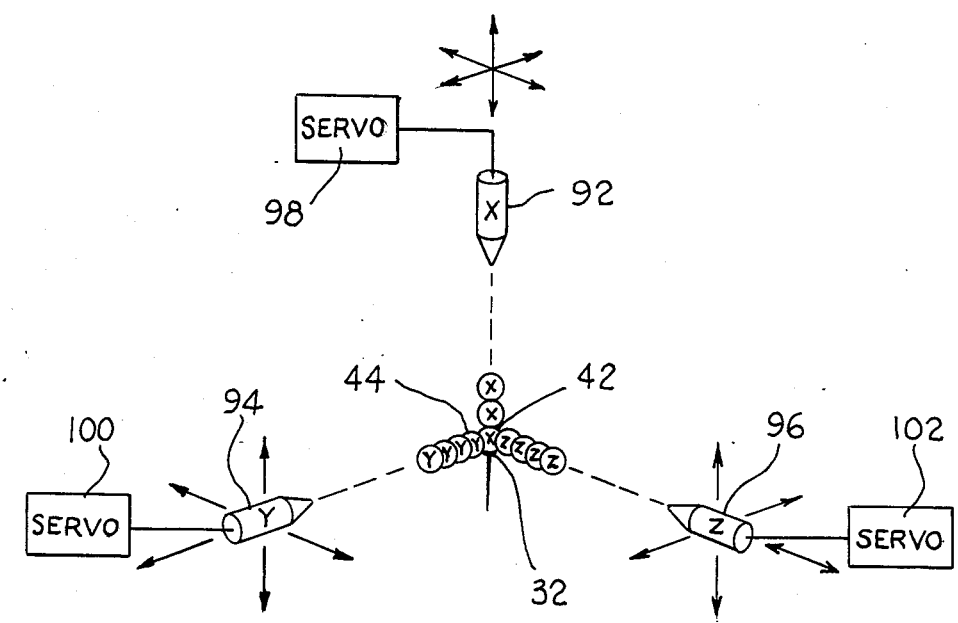
FIG. 6 is a perspective view illustrating another apparatus and method for automatically reproducing a three-dimensional object which has been designed on a computer machine in accordance with the present invention.

FIG. 6 illustrates three working heads, 92, 94, and 96 in a cartesian coordinate system for ejecting particulate matter in yet another system according to the invention. This is similar to the system and method of FIGS. 4 and 5 wherein intersecting energy beams are utilized to locate the particulate matter at the X, Y, Z coordinates. Servos 98, 100, and 102 direct the ejection guns 92, 94, and 96, respectively, in accordance with the three-dimension coordinate file (X, Y, Z) representing the designed article.

While the preceding has described many different mechanical systems for directing the particles to the three-dimensional coordinates which correspond to the three-dimensional design of an article being constructed, it is to be understood that other methods for directional control of particles may also be utilized. For example, it is known in the art of ink jet printing to control the direction and final destination of droplets by using charged particles which are electrostatically deflected to a desired point or coordinate, as is desired in the present invention. It is contemplated that any of the principles of particle directing as carried out in these arts may also be compatible with the methods and goals heretofore described, and that having been taught the invention, one of average skill in the art may readily apply these principles to the present invention. U.S. Pat. Nos. 4,400,705 and 4,408,211 illustrate ink jet type devices and methods and apparatus for directing the ink droplets to a desired point.

Regardless of the electro/mechanical and coordinate system used, it is desired that the distance of the working heads from the target, each coordinate point, be kept uniform so that the particles impact each other at the coordinate points with uniform force. This prevents or reduces distortion of the shape of the three-dimensional design. This may be done by programming this function into the machine controller program as is well within the skill of a computer programmer.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A method for the three-dimensional reproduction of an article from a data file generated in response to creation of said three-dimensional design of the article on a computer machine, said method comprising:

providing a data file of coordinate information representing a three-dimensional design of said article in a three-dimensional coordinate system;

providing a servo-mechanism having at least one movable working head;

providing a computer programmed controller for controlling said servo-mechanism and the movement and position of said working head;

transferring coordinate information from said data file to said programmed controller for controlling said working head in response to said coordinate information;

providing a controlled environment;

supporting an origination seed in said controlled environment to provide a point of origin in said coordinate system about which said article is constructed;

providing a source of mass particles;

emitting a directional energy beam from said working head for directing movement of said mass particles in said coordinate system;

controlling said servo-mechanism to position said working head in response to said coordinate information for directing said mass particles to said three-dimensional coordinates of said design in said coordinate system; and joining said mass particles with one another at said coordinates beginning with said origination seed to physically construct said article in three-dimensions about said origination seed.

2. The method of claim 1 wherein said particles are included in said energy beam for direction to said coordinates.

3. The method of claim 1 wherein said particles are attracted by said energy beam to direct said particles toward said coordinates.

4. The method of claim 1 including:
providing two or more of said working heads each of which emits an energy beam;
intersecting said beams at said coordinate in said three-dimensional coordinate system to locate said particles at said coordinate; and
locating and joining said particles at said coordinates of intersections by forces created by said intersecting beam at said intersecting coordinates.

5. The method of claim 1 wherein said mass particles are a ceramic material and said controlled environment is a closed environment heated or cooled to a desired temperature.

6. The method of claim 1 wherein said mass particles include a plastic material and said controlled environment includes an ionized atmosphere.

7. The method of claim 1 wherein said mass particles includes a slurry material with a high water content and said controlled environment includes a closed environment cooled to a sub-zero environment.

8. The method of claim 1 including maintaining a uniform distance between said working head and said coordinates when said particles are directed to respective coordinates so that said particles impact each other at said coordinate with uniform force to reduce distortion of said three-dimensional design shape.

9. A method for designing an article in two dimensions and then reproducing the article design in three dimensions comprising:
generating a data file of three-dimensional coordinates on a computer machine representing the three-dimensional design of said article in a coordinate system;
providing a controlled environment;
providing an origination seed in said controlled environment which serves as a point of origin in said coordinate system;
providing a source of mass particles;
directing said particles to said three-dimensional coordinates of said article in said coordinate system;
positioning said particles at said coordinates; and
joining said particles to one another at said coordinates to build up said article in three dimension about said origination seed.

10. The method of claim 9 including pushing said mass particles towards said coordinates in said coordinate system for directing said particles to said coordinates.

11. The method of claim 9 including pulling said mass particles to said coordinates and positioning said particles at said coordiantes.

12. The method of claim 9 including controlling the impact force of said mass particles so that said particles impinge upon each other at said coordinates with a uniform force for controlled adherence with one another and low design distortion.

13. The method of claim 9 including utilizing electromagnetic force to direct said mass particles towards said coordinates.

14. The method of claim 9 including utilizing magnetic force to direct said mass particles towards said coordinates.

15. The method of claim 9 including providing a controlled charge energy beam to direct said mass particles towards said coordinates in said coordinate system.

16. The method of claim 9 including:
intersecting a pair of energy beams at points of intersection corresponding to said three-dimensional coordinates; and
utilizing forces produced by said intersecting beams at said points of intersection to locate and join said particles at said coordinates.

17. Apparatus for reproducing a physical three-dimensional article from a data file generated on a computer machine on which said article was designed comprising:
a data file of three-dimensional coordinate information which corresponds to the design of said article in a three-dimensional coordinate system and space;
a controlled environment;
a physical origination seed which serves as a point of origin of said three-dimensional coordinate system;
means for locating said seed point in said controlled environment at the origin of said coordinate system;
a source of mass particles;
directional means for directing said mass particles to said coordinates in said coordinate system within said controlled environment;
control means for controlling said directional means in response to said coordinate information in said data file; and
means for joining said mass particles together at said coordinates to physically construct said article in three-dimensions about said origination seed.

18. The apparatus of claim 17 wherein said directional means includes an ejection head for emitting and directing droplets of said mass particles to said coordinates in said coordinate system within said controlled environment.

19. The apparatus of claim 17 wherein said directional means includes a pair of working heads each of which emits a controlled energy beam, and
working heads being disposed relative to said coordinate system such that said energy beams intersect each other at intersection points corresponding to said coordinates to locate said mass particles at said coordinates.

20. The apparatus of claim 17 including:
said directional means including at least one working head for emitting a controlled energy beam which directs said mass particles to said coordinates;
servo means for moving said working head; and
programmed controller means for controlling said servo means in response to said coordinate information in said data file to move and position said working gun for directing said mass of particles to said three-dimensional coordinates.

21. The apparatus of 20 including means for controlling said servo means for moving said working heads toward and away from said coordinates in order to maintain a uniform distance between said working head and a target coordinate so that particles impinge upon each other at said coordinates with uniform force for low design shape distortion.

22. The apparatus of claim 17 including:
a polar coordinate system;
said directional means for directing said mass particles including a first directional ejection head emitting a directional beam in a polar plane of said polar coordinate system;
a second directional ejection head carried spaced from said polar plane for directing an energy beam toward said polar plane; and
servo means for controlling movement of said first and second ejection heads.

23. The apparatus of claim 17 wherein said directional means includes;
an arcuate support;
means for rotating said arcuate support in 360 degrees of freedom; and
an ejection head carried by said arcuate support movable in 180 degrees of freedom for emitting said energy beam.

24. The apparatus of claim 17 including a closed chamber;
directional means carried in said closed chamber for emitting a plurality of directional energy beams;
said source of mass particles being contained within said chamber;
said origination seed being disposed within said chamber; and
means for controlling said directional beams to intersect at desired intersection points to correspond to said coordinates to attract said particles at said intersection points and join said particles together at said coordinates.

25. A method for the three-dimensional reproduction of an article from a data file generated in response to creation of a three-dimensional design on a computer machine, said method comprising:
providing a data file of coordinate information representing a three-dimensional design of said article in a three-dimensional coordinate system;
providing a working head which emits an energy beam for directing mass particles to the respective coordinates of said three-dimensional design in said coordinate system;
providing a controlled environment;
locating an origination seed in said control environment to provide a point of origin in said coordinate system about which said article is constructed;
moving said working head in response to said data file of three-dimensional coordinates to emit said energy beam to direct and locate said particles at said coordinates; and
joining said mass particles located at said coordinates of said three-dimensional coordinate system beginning with said origination seed to physically reconstruct said article in three-dimensions about said origination seed.

26. The method of claim 25 wherein said energy beam includes said mass particles which are directed to said coordinates.

27. The method of claim 25 including:
providing a plurality of working heads;
moving said working heads so that the energy beams emitted thereby intersect one another at said respective coordinates of said coordinate system;
providing said mass particles in said control environment; and
locating said mass particles at the points of intersection of said energy beams to locate said mass particles at said coordinates.

28. The method of claim 25 including moving said working heads to maintain a uniform distance between said working heads and said coordiates toward which mass particles are directed so that distortion of said three-dimensional shape is thereby reduced.

* * * * *